United States Patent Office 3,661,834
Patented May 9, 1972

3,661,834
RESILIENT PLASTIC ARTICLE AND PROCESS FOR FORMING THE SAME
Robert H. Pasley, Coral Gables, Fla., assignor to Royalty Designs of Florida, Inc., Hialeah, Fla.
No Drawing. Filed Feb. 4, 1970, Ser. No. 8,688
Int. Cl. C08f *45/38, 45/26, 47/20;* C08g *53/18*
U.S. Cl. 260—34.2          5 Claims

ABSTRACT OF THE DISCLOSURE

This disclosure deals with a novel quivery resilient plastic article and process for forming the same useful for cushioning purposes and for application as protective coatings, involving a very highly plasticized, preferably polyvinyl chloride plastic, having ratios of plasticizer-to-resin of the order of substantially 12-to-1 ± about 35%.

---

The present invention relates to highly resilient plastic articles and processes for forming the same.

In copending application Ser. No. 625,214, filed Mar. 22, 1967, for Fabric Carried Plastic Article and Process for Forming the Same, now abandoned, there is disclosed a novel quivery resilient plastic that is adapted for such purposes as decorating or other attachment to fabric or other surfaces and that in and of itself provides novel protective and cushioning effects. A preferred embodiment involves polyvinyl chloride combined with oily plasticizers in highly unconventional plasticizer ratios of the order of from 400 to 600 parts of plasticizer for each 100 parts of the resin. These unusual ratios have been found to adapt the plastic to stretch and compress to an unusually broadband degree, such that when applied to fabrics or other surfaces, it matches the give of such surfaces in use and, when thick enough, provides a protective or non-bottoming cushion which enables articles placed thereupon or applied thereagainst to float on or within the plastic mass, protecting the fabric or other surface. In the case where no backing is used, the flexing or cushioning property of the mass proper inherently provides such effects.

It has been found that the rather critical degree of control of the plasticizer within such highly unconventional limits causes the plastisol to pass from its liquid room temperature state through a gel state to an increased or high temperature second liquid state. The first phase change from the room temperature liquid state to the gel state occurs in the range of from about 220 to 280 degrees F. for polyvinyl chloride; and the second high-temperature liquid state occurs at the order of about 340 degrees F., more or less. Cooling then results in fusion or solidifying of the plastic into the highly resilient mass, which effect takes place as the temperature drops to about 170 degrees F.

While such materials and processes have been found to work admirably in practice, particularly for such applications as protecting and decorating fabric and similar surfaces, there are applications where more severe requirements are placed upon the protecting or cushioning effects desired of the resilient quivery plastic material. In some prosthetic or medical applications, indeed such as floating the body or some part thereof upon a surface which will enable the body or part to float and not bottom within the plastic material and thus results in the application of equalized pressure to the body or part, more stringent requirements are often placed on the quivery resilient plastic. While it has been found that greater quantities of plasticizer cause deleterious migration of the same out of the finished product as an oily substance, in accordance with the invention, use is made of this previously undesirable phenomenon in providing a cooling and lubricating surface for the body or part thereof that is cushioned or floating within the plastic mass. Other useful purposes for this migration, moreover, have been found to reside in those applications where surfaces to be covered may well be further protected or treated with oil, as in the case of metal parts and other surfaces and the like. The continual slight exudation of the oil from the material, in addition, keeps the plastic highly resistant to contamination and tends to be self-cleaning.

It is accordingly to the provision of such objectives that the present invention is primarily directed, it being an object to provide a new and improved plastic and process for forming the same which shall be particularly adapted to non-bottoming or cushioning purposes and which may, if desired, take advantage of the previously disadvantageous effect of migration of oil from the quivery resilient plastic of high plasticizer content.

A further object is to provide a novel plastic and process of more general utility, as well.

Other and further objects will be explained hereinafter in this specification (the invention not requiring illustration by drawings), and such are more particularly pointed out in the appended claims. In summary, however, the invention from one of its aspects contemplates a novel quivery resilient plastic, preferably comprising polyvinyl chloride resin, highly plasticized to the order of 12 to 1 (plasticizer-to-resin ratio), plus or minus about 35 percent, and in some cushioning applications, of thickness greater than substantially one and one-half inches.

It has been found, contrary to prior expectation and experience in this art that, through carrying the phase changes from the original highly plastized polyvinyl chloride hot melt liquid to the gel state and then to a second high-temperature liquid state, and finally down in temperature to the fusion state, very large ratios of plasticizer to resin, far in excess even of the unconventional high ratios before-mentioned, can be used while still maintaining the resulting quivery resilient plastic in a solid enough state that it will not fall apart or deteriorate, but, to the contrary, will retain and restore its shape despite repeated compression, as when used to cushion the body or parts thereof or other articles to be floated thereon or therein. Specifically, it has been found that this unexpected result can be produced by rather rapidly carrying the highly plasticized polyvinyl chloride melt or the like, into the range of approximately 220 degrees F., whence it converts to the gel state. By continuing the heating, the gel will become liquified again into a different or higher temperature liquid state somewhat in the neighborhood of 350–400 degrees F., more or less, though in some cases even at somewhat higher temperatures. By maintaining this high temperature until it is insured that all of the gel has uniformly liquified, it has been found that the hot liquid may be cooled down as much as one hundred degrees, more or less, and still remain liquid. Further cooling to the order of about 170 degrees F., will produce fusion or solidifying into a uniformly quivery resilient mass that, despite the very large amount of plasticizer, will actually hold the plasticizer and resin together, and maintaining the cast shape or configuration even in the presence of considerable flexing or other mechanical abuse.

It has also been determined, with the above ratios of plasticizer, such as of the Union Carbide "Flexol" 380 type, the Monsanto "Santicizer No. 912" (RD5), or other similar plasticizers and with type 121 PVC plastic (or where less oil is desired, Union Carbide Type QYKV), that a rather uniform and continual migration of the oily substance from the plasticizer out of the quivery resilient plastic mass will take place without deterioration of the quivery resilient mass itself. In accordance with the present invention, use can be made of this phenomenon to provide a cooling and lubricating surface in the above-mentioned applications. If desired, however, the quivery mass may be covered for color, texture, or similar purposes.

Unusually effective non-bottoming or cushioning effects have been obtained, as for the prosthetic purposes above-mentioned, if such quivery resilient material is formed in thicknesses in excess of about an inch; specifically of the order of an inch for resting the hand, foot or articles of similar weight and properties, and greater thicknesses, as of about two inches for heavier parts of the body. Under such circumstances, an automatic distribution of the weight and pressure over a large area occurs without bottoming, which is a highly useful result for these and similar purposes.

Even as compared with the previously unusual high ratios of 6-to-1 of plasticizer-to-polyvinyl chloride resin, such 12-to-1 ratios, plus or minus 35%, have been found to produce remarkable performance that is substantially a difference in kind. Whereas a 6-to-1 ratio will produce a stretch of about one inch upon receipt of 500 grams of pressure thereupon, there will be relatively negligible radial elongation of the mass and a very small depth penetration in the floating process to the order of a sixteenth of an inch, more or less. In addition, the tensile strength to breakage in the case of, for example, a strip 3" long and ¼" in cross-section, is relatively high, being in excess of 14 pounds. With the 12-to-1 ratio, on the other hand, and with the same polyvinyl chloride resin and plasticizer, the mass becomes converted to a radically different flesh-like consistency producing more than two and a quarter times the stretch in response to the 500 grams of force, with eight times the depth of deformation and with 1/16 inch of radical elongation; and this, with a much smaller tensile strength to breakage or friability only of the order of about one and a quarter pounds. The remarkable ability of the 12-to-1 ratio plastic to produce such a markedly improved distribution of weight for large areas in cushioning effects, has rendered the device extremely useful for such critical purposes as the prosthetic application previously mentioned.

Where other uses of the uniform and gradual bleeding of the oil from the quivery resilient mass are to be employed, the thickness is not quite so important. For example, the second high-temperature hot liquid has been fused by applying the same to metal or other surfaces, as by spraying against such surfaces. Upon contact, the mass rapidly cools to the fusion point and a rather strong adherence is provided which can, however, be rather readily peeled off the metal or other surface, when so desired. The bleeding of the oil, of course, keeps the metal from rusting. Similar remarks apply with regard to other surfaces that can also benfit from such a coating. Techniques for application besides such spraying will, of course, readily occur to those skilled in the art.

The material of the invention, moreover, has been discovered to have rather remarkable heat insulating and cold-retaining properties, maintaining its temperature substantially constant over a long period of time with very slow dissipation or other change thereof. Thus, it has been found to be excellent as a hot pad or a cold compress, additionally providing its advantageous equalized pressure properties when applied to the body. Even at room temperature, the material feels cooler than the environment apparently because of the slow exudation of the aromatic oil. Concurrent with these properties, in addition, are favorable acoustic isolation characteristics, as well.

Further modifications will also suggest themselves and all such are considered to fall within the spirit and scope of the invention as defined in the appended claims.

What is claimed is:

1. A process for forming a quivery resilient plastic, that comprises, forming a liquid mixture of polyvinyl chloride resin with an oily plasticizer in the plasticizer-to-resin ratio of substantially 12:1 ± about 35 percent, heating the liquid mixture in the range of substantially 220–280 degrees F. until it assumes a gel state, continuing such heating to at least about 340 degrees F. until the gel converts to a second high-temperature liquid state, and reducing the temperature to about 170 degrees F. and below to fuse the same.

2. A process as claimed in claim 1 and in which the step is performed of applying the liquid of the second high-temperature liquid state to surfaces-to-be-protected while cooling the same to affect said fusing.

3. A process as claimed in claim 1 and in which the plastic is fused in thickness of the order of and in excess of substantially an inch.

4. A quivery resilient polyvinyl chloride plastic made by the process of claim 1.

5. A quivery resilient plastic as claimed in claim 4 having a thickness of the order of and greater than substantially an inch to provide a non-bottoming cushion.

References Cited

UNITED STATES PATENTS 2,852,482  9/1958  Graham _____ 260—31.2

MORRIS LIEBMAN, Primary Examiner

T. DeBENEDICTIS, Sr., Assistant Examiner

U.S. Cl. X.R.

260—30.6, 30.8, 31.2, 31.8, 32.6